United States Patent
Fukui et al.

(10) Patent No.: US 7,297,446 B2
(45) Date of Patent: Nov. 20, 2007

(54) NEGATIVE ELECTRODE FOR RECHARGEABLE LITHIUM BATTERY AND METHOD FOR FABRICATION THEREOF

(75) Inventors: Atsushi Fukui, Kobe (JP); Mariko Torimae, Kobe (JP); Yasuyuki Kusumoto, Kobe (JP); Hisaki Tarui, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 195 days.

(21) Appl. No.: 10/809,848

(22) Filed: Mar. 26, 2004

(65) Prior Publication Data
US 2004/0191631 A1  Sep. 30, 2004

(30) Foreign Application Priority Data
Mar. 28, 2003 (JP) ............................. 2003-090502

(51) Int. Cl.
H01M 4/70 (2006.01)
H01M 4/72 (2006.01)
H01M 4/64 (2006.01)

(52) U.S. Cl. .................. 429/233; 429/235; 429/236; 429/237; 429/243; 429/231.95; 427/58

(58) Field of Classification Search ........... 429/231.95, 429/233, 235, 236, 237, 243; 427/58
See application file for complete search history

(56) References Cited

U.S. PATENT DOCUMENTS

| | | | | |
|---|---|---|---|---|
| 6,051,340 A | 4/2000 | Kawakami et al. | .... | 429/231.95 |
| 6,887,623 B2 * | 5/2005 | Fujimoto et al. | ........... | 429/232 |

FOREIGN PATENT DOCUMENTS

| | | | |
|---|---|---|---|
| EP | 1 244 163 A1 | | 9/2002 |
| EP | 1244163 A1 | * | 9/2002 |
| EP | 1335438 A1 | * | 8/2003 |
| JP | 2000-12088 A | | 1/2000 |
| JP | 2002-313319 A | | 10/2002 |
| JP | 2002-319408 A | | 10/2002 |
| WO | 02/21616 A1 | | 3/2002 |

* cited by examiner

Primary Examiner—Patrick Joseph Ryan
Assistant Examiner—Angela J. Martin
(74) Attorney, Agent, or Firm—Kubovcik & Kubovcik

(57) ABSTRACT

A negative electrode for a rechargeable lithium battery which is obtained by sintering under a non-oxidizing atmosphere, in the form of a layer on a surface of a metal foil current collector, an anode mix containing a binder and particles of active material containing silicon and/or a silicon alloy; the negative electrode being characterized in that the metal foil current corrector has projections and recesses on its surface, the projection is shaped to have a recurved side face portion that curves more outwardly as it extends closer to a distal end of the projection, and the binder penetrates into spaces defined by the recurved side face portions.

16 Claims, 4 Drawing Sheets

NEGATIVE ELECTRODE FOR RECHARGEABLE LITHIUM BATTERY AND METHOD FOR FABRICATION THEREOF

BACKGROUND OF THE INVENTION

1. Technical Field

The present invention relates to a negative electrode for a rechargeable lithium battery, a method for fabrication thereof and a rechargeable lithium battery using the same.

2. Description of Related Art

As one of new types of rechargeable batteries having high power and high energy density, rechargeable lithium batteries have been recently utilized which are charged and discharged by the transfer of lithium ions through a non-aqueous electrolyte solution between the positive and negative electrodes.

The use of lithium-alloying materials, such as silicon materials, as a negative active material of such a rechargeable lithium battery has been studied. Silicon materials and other lithium-alloying materials however expand and shrink in volume when they store and release lithium. Accordingly, such active materials are pulverized or caused to fall off from the current collector upon charge-discharge cycling. This reduces the current-collecting capacity within the electrode and results in poor charge-discharge cycle characteristics, which have been problems.

In the attempt to solve the above-described problems, the present applicant has proposed a negative electrode for a rechargeable lithium battery (International Publication No. 02/21616). This negative electrode is obtained by depositing a layer of an anode mix, which contains a binder and particles of active material containing silicon and/or a silicon alloy, on a surface of a current collector and then sintering the deposit under the non-oxidizing atmosphere.

However, even such a negative electrode of a rechargeable lithium battery encounters an occasion where the layer of anode mix is delaminated from the current collector as the active material expands and shrinks during a charge-discharge reaction, resulting in the failure to obtain satisfactory charge-discharge cycle performance characteristics.

SUMMARY OF THE INVENTION

It is an object of the present invention to provide a negative electrode for a rechargeable lithium battery, which uses particles of active material containing silicon and/or a silicon alloy and which can suppress reduction of current-collecting capacity within the electrode and further improve cycle performance characteristics, as well as providing a method for fabrication thereof and a rechargeable lithium battery.

The negative electrode for a rechargeable lithium battery, in accordance with the present invention, is obtained by sintering under a non-oxidizing atmosphere, on a surface of a metal foil current collector, an anode mix layer containing a binder and particles of active material containing silicon and/or a silicon alloy. Characteristically, the metal foil current collector has projections and recesses on its surface. The projection is shaped to have a recurved side face portion that curves more outwardly as it extends closer to a distal end of the projection. The binder penetrates into spaces defined by the recurved side face portions.

In the present invention, a metal foil current collector is used which has projections and recesses on its surface. The projection is shaped to have a recurved side face portion which curves more outwardly as it extends closer to a distal end of the projection. An anode mix layer containing a binder and particles of active material is provided on this metal foil current collector such that the binder penetrates into spaces defined by the recurved side face portions of the projections. When the binder moves away from the current collector, it stops against these recurved side face portions and is restrained from coming off from the current collector. Accordingly, even if the particles of active material expand and shrink in volume during a charge-discharge reaction, separation of the anode mix layer from the current collector is prevented to maintain the current collecting capacity within the electrode. As a result, cycle performance characteristics can be improved.

In the present invention, the projection is preferably shaped to have a narrow portion which defines the recurved side face. The narrow portion, as used herein, means a configuration which decreases and then increases in diameter toward a distal end of the projection. Formation of such a narrow portion is more effective in preventing separation of the anode mix layer from the current collector, resulting in the further improved cycle performance characteristics.

In the present invention, it is also preferred that not only the binder but also the particles of active material penetrate into the space defined by the recurved side face portions of the projections. Penetration of the particles of active material into the spaces defined by the recurved side face portions further reduces the occurrence of the anode mix layer to separate from the current collector, resulting in the further improved cycle performance characteristics.

FIG. 1 is a sectional view which shows one embodiment of the projection on the current collector in accordance with the present invention. A current collector 1 has projections and recesses on its surface 1a. The projection 2 is shaped to include a portion which decreases and then increases in diameter toward a distal end of the projection. That is, a horizontal section of the portion decreases and then increases in area as it approaches the distal end of the projection. So, the projection 2 is shaped to have a narrow portion. This narrow portion defines a recurved side face portion 2a which curves more outwardly as it extends closer to the distal end.

FIG. 2 is a sectional view, showing another embodiment of the projection on the current collector in accordance with the present invention. The current collector 1 has projections and recesses on its surface 1a. The projection 2 is shaped to decrease in diameter toward the distal end of the projection. The distal end extends in the right direction on the drawing to define the recurved side face portion 2a on the right side of the projection 2. Accordingly, a part of the side face of the projection 2 is recurved. In the present invention, only a part of the side face of the projection may be recurved, as illustrated by this embodiment.

FIG. 3 is a sectional view of the current collector in the condition of carrying an anode mix layer thereon. The anode mix layer, which comprises a binder 3 and particles 4 of active material, is provided on a surface 1a of the current collector 1. The current collector 1 has projections 2 on its surface 1a. The projection 2 has a recurved portion 2a on its side face. The anode mix layer penetrates into recesses located between adjacent projections 2. Accordingly, the binder 3 and the particles 4 of active material penetrate into spaces defined by the recurved portions 2a. When the anode mix layer moves away from the current collector 1, the binder 3 and the particles 4 of active material stop against the recurved portions 2a of the projections 2, thereby reducing the occurrence of the anode mix layer to come off from the current collector 1. Therefore, in accordance with the present invention, the occurrence of the anode mix layer to come off from the current collector during charge-discharge cycles is effectively reduced to maintain the current collecting capacity within the electrode, resulting in the improve cycle performance characteristics.

FIG. 4 is a sectional view which shows one embodiment of the metal foil current collector in accordance with the present invention. The current collector has projections and recesses on its surface. The projection is shaped to have a recurved side face portion.

FIG. 5 is a sectional view, showing a comparative metal foil current collector. Although the comparative metal foil current collector has projections and recesses on its surface, as shown in FIG. 5, the projections have a generally pyramid shape which decreases in diameter toward its distal end. Unlike the projections of the metal foil current collector shown in FIG. 4, these projections have no recurved side face portions. The metal foil current collector shown in FIG. 5 comprises a metal foil made by an electrolytic process, for example. A typical example of such a metal foil is an electrolytic copper foil.

The metal foil current collector shown in FIG. 4 can be obtained by subjecting the metal foil shown in FIG. 5 to a surface roughening treatment by an electroplating process such as cover plating. Specifically, such a metal foil current collector can be obtained by cover-plating copper or a copper alloy on an electrolytic copper or copper alloy foil.

The metal foil current collector can also be obtained by subjecting the metal foil to other surface roughening treatment such as plating, vapor growth, etching or polishing. These treatments may be followed by cover plating. Plating includes electroplating and electroless plating. Examples of vapor growth processes include sputtering, CVD and evaporation. Etching may be achieved either physically or chemically. Polishing may be carried out using a sand paper or with blast.

In the present invention, the metal foil current collector may be composed of copper, nickel, iron, titanium, cobalt or an alloy of any combination thereof, for example. It is particularly preferred that the metal foil current collector contains a metal element which is readily diffusible into the active material. The current collector preferably comprises a metal foil containing a copper element. A copper foil and a copper alloy foil are particularly preferred. Because a heat treatment promotes diffusion of copper into silicon active material, sintering is expected to improve adhesion between the current collector and the active material. When sintering is applied to improve adhesion between the current collector and the active material, it is preferred to use a metal foil, as a current collector, which carries a copper-containing layer on its surface in proximity of the active material. Accordingly, when a copper-free metal foil is used, a copper layer or a copper alloy layer is preferably deposited on its surface.

The current collector in the present invention preferably has a surface roughness Ra of 0.2 µm or above. The use of such a current collector having the specified surface roughness Ra increases a contact area of the anode mix layer and the current collector, resulting in the improved adhesion therebetween. This further improves the current collecting capacity within the electrode. In the case where the anode mix layer is disposed on opposite sides of the current collector, it is preferred that each side of the current collector has a surface roughness Ra of 0.2 µm or above.

Surface roughness Ra is defined in Japanese Industrial Standards (JIS B 0601-1994) and can be measured as by a surface roughness meter.

In the present invention, the thickness of the current collector is not particularly specified but may preferably be within the range of 10-100 µm.

In the present invention, an upper limit of the surface roughness Ra is not particularly specified. However, in view of the current collector thickness that is preferably in the range of 10-100 µm, it is preferred that the substantial upper limit of the surface roughness Ra does not exceed 10 µm.

In the present invention, the thickness X of the anode mix layer, the thickness Y of the metal foil current collector and its surface roughness Ra preferably satisfy relationships $5Y \geq X$ and $250Ra \geq X$. If the thickness X of the anode mix layer exceeds 5Y or 250Ra, the occasional delamination of the anode mix layer from the current collector may result.

The thickness X of the anode mix layer is not particularly specified but may preferably be 1,000 µm or below, more preferably 10 µm-100 µm.

In the present invention, an electrically conductive powder can be incorporated in the anode mix layer. Such a conductive powder, when added, surrounds particles of active material to form an electrically conductive network, resulting in further improving the current collecting capacity within the electrode. The conductive powder may preferably be made from materials similar in type to those used for the metal foil current collector. Specific examples of useful materials include metals such as copper, nickel, iron, titanium and cobalt; alloys and mixtures of any combination thereof. A copper powder, among metal powders, is particularly useful. The use of a conductive carbon powder is also preferred.

Preferably, the conductive powder is added to the anode mix layer in the amount that does not exceed 50% of a total weight of the conductive powder and active material particles. If the conductive powder added is excessive in amount, a proportion of the active material particles becomes relatively small to result in lowering a charge-discharge capacity of the electrode.

The active material particles for use in the present invention may comprise silicon and/or silicon alloy particles. Examples of silicon alloys include solid solutions of silicon and other one or more elements, intermetallic compounds of silicon with other one or more elements and eutectic alloys of silicon and other one or more elements. Alloying can be achieved by such methods as arc melting, liquid quenching, mechanical alloying, sputtering, chemical vapor growth and calcination. Examples of liquid quenching methods include a single roll quenching method, a twin roll quenching method and various atomizing methods including gas atomizing, water atomizing and disk atomizing.

The active material particles for use in the present invention may also comprise silicon and/or silicon alloy particles with their surfaces being coated with a metal or the other. Coating can be achieved by such methods as electroless plating, electroplating, chemical reduction, evaporation, sputtering and chemical vapor deposition. Preferably, the coating metal is the same type of metal as the metal foil for use as the current collector. In the sintering, the active material particles, if coated with the metal identical in type to the metal foil, exhibit the marked improvement in adhesion to the current collector. This results in obtaining further improved charge-discharge cycle performance characteristics.

The active material particles for use in the present invention may contain particles composed of material that alloys with lithium. Examples of such lithium-alloying materials include germanium, tin, lead, zinc, magnesium, sodium, aluminum, gallium, indium and their alloys.

The mean particle diameter of the active material particles for use in the present invention is not particularly specified but may preferably be up to 100 μm, more preferably up to 50 μm, most preferably up to 10 μm, to insure effective sintering. The better cycle performance characteristics can be obtained as the mean particle diameter of the active material particles becomes smaller. The mean particle diameter of the conductive powder useful for incorporation into the anode mix layer is not particularly specified but may preferably be up to 100 μm, more preferably up to 50 μm, most preferably up to 10 μm.

The binder for use in the present invention is preferably of the type that remains fully undecomposed after the heat treatment for sintering. As stated above, sintering improves adhesion between the active material particles and the current collector and between the active material particles themselves. If the binder remains undecomposed even after the heat treatment, the binding ability thereof further improves such adhesion. Also, the use of a metal foil having a surface roughness Ra of 0.2 μm or above as the current collector allows the binder to penetrate into recesses on a surface of the current collector. Then, an anchor effect is created between the binder and the current collector to further improve adhesion of the active material particles to the current collector. Accordingly, even if the active material expands and shrinks in volume as lithium is stored and released, separation of a layer of the active material from the current collector can be suppressed to result in obtaining satisfactory charge-discharge cycle performance characteristics.

A preferred example of the binder for use in the present invention is polyimide. Polyimide, either thermoplastic or thermosetting, are useful. Also, polyimide can be obtained, for example, by subjecting polyamic acid to a heat treatment.

The heat treatment causes polyamic acid to undergo dehydrocondensation to produce polyimide. Preferably, such polyimide has an imidization level of at least 80%. The imidization level, as used herein, refers to a mole % of the produced polyimide relative to a polyimide precursor (polyamic acid). Polyimide with at least 80% imidization level can be obtained, for example, by subjecting N-methylpyrrolidone (NMP) solution of polyamic acid to a heat treatment at a temperature of 100° C.-400° C. for over 1 hour. In an exemplary case where the heat treatment is carried out at 350° C., the imidization level approaches 80% in about 1 hour and 100% in about 3 hours.

In the present invention, in the case of using polyimide as a binder, sintering is preferably carried out at a temperature insufficient to cause full decomposition of polyimide, i.e., at 600° C. or below, because the binder is preferred to remain fully undecomposed even after the heat treatment for sintering.

In the present invention, the amount by weight of the binder in the anode mix layer is preferably at least 5% of a total weight of the anode mix layer. Also preferably, the binder volume is at least 5% of a total volume of the anode mix layer. If the amount of the binder in the anode mix layer is excessively small, adhesion between the components within the electrode may become insufficient. If the amount of the binder in the anode mix layer is excessively large, an internal resistance of the electrode increases to occasionally result in the difficulty to initiate a charge. Accordingly, it is preferred that the amount by weight of the binder in the anode mix layer does not exceed 50% of the total weight of the anode mix layer. It is also preferred that the binder volume does not exceed 50% of the total volume of the anode mix layer.

The fabrication method of the present invention is a method for fabricating the negative electrode of the present invention for a rechargeable lithium battery. The method is characterized as including the steps of providing a metal foil current collector which has recesses and projections on its surface, the projection being shaped to have a recurved side face portion that curves more outwardly as it extends closer to a distal end of the projection; providing a layer of an anode mix on the surface of the metal foil current collector, the anode mix containing a binder and particles of active material that contains silicon and/or a silicon alloy; and sintering, under a non-oxidizing atmosphere, the anode mix layer while placed on the surface of the metal foil current collector.

In the present invention, the anode mix layer can be provided on the surface of the metal foil current collector by dispersing the particles of active material in a solution of the binder to prepare a slurry and applying said slurry onto the surface of the metal foil current collector.

Also in the fabrication method of the present invention, the anode mix layer is first provided onto the metal foil current collector. Prior to being sintered, they are preferably rolled or calendered. Such calendering increases a packing density of the anode mix layer and improves adhesion between the active material particles themselves and between the anode mix layer and the current collector. This results in obtaining further improved charge-discharge cycle performance characteristics.

In the present invention, sintering is carried out under a non-oxidizing atmosphere. Such sintering can be carried out under vacuum or under a nitrogen, argon or other inert gas atmosphere, for example. Alternatively, sintering may be carried out under a hydrogen or other reducing atmosphere. Preferably, sintering is accomplished by a heat treatment at a temperature that exceeds neither a melting point of the metal foil current collector nor a melting point of the active material particles. In an exemplary case where a copper foil is used as the metal foil current collector, the heat treatment temperature is preferably maintained not to exceed its melting temperature, i.e., 1083° C., more preferably within the range of 200-500° C., further preferably 300-450° C. A spark plasma sintering or hot pressing technique may be utilized to achieve sintering.

The rechargeable lithium battery of the present invention is characterized as including a negative electrode either comprising the negative electrode of the present invention or fabricated by the fabrication method of the present invention, a positive electrode containing positive electrode material, and a nonaqueous electrolyte.

A solvent of the nonaqueous electrolyte for use in the rechargeable lithium battery of the present invention is not particularly specified in type but can be illustrated by a mixed cyclic carbonate-chain carbonate solvent. Examples of cyclic carbonates include ethylene carbonate, propylene carbonate, butylene carbonate and vinylene carbonate. Examples of chain carbonates include dimethyl carbonate, methyl ethyl carbonate and diethyl carbonate. Also applicable is a mixed solvent which contains the cyclic carbonate, as listed above, and an ether solvent such as 1,2-dimethoxyethane or 1,2-diethoxyethane. A solute of the nonaqueous electrolyte can be illustrated by $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$ and mixtures thereof. Particularly preferred for use as such a solute is a mixed solute of LiXF$_y$ (wherein X is P, As, Sb, B, Bi, Al, Ga or In, and y is 6 if X is P, As or Sb or 4 if X is B, Bi, Al, Ga or In) either with lithium perfluoroalkylsulfonyl imide LiN(C$_m$F$_{2m+1}$SO$_2$)(C$_n$F$_{2n+1}$SO$_2$) (wherein m and n are independently intergers of 1-4) or with lithium perfluoroalkylsulfonyl methide LiN(C$_p$F$_{2p+1}$SO$_2$)(C$_q$F$_{2q+1}$SO$_2$)(C$_r$F$_{2r+1}$SO$_2$)(wherein p, q and r are independently integers of 1-4). Among them, the use of the mixed solute of LiPF$_6$ and LiN(C$_2$F$_5$SO$_2$)$_2$ is particularly preferred. Other applicable electrolytes include, for example, gelled polymer electrolytes comprised of an electrolyte solution impregnated into polymer electrolytes such as polyethylene oxide and polyacrylonitrile, and inorganic solid electrolytes such as LiI and Li$_3$N. The electrolyte for the rechargeable lithium battery of the present invention can be used without limitation, so long as a lithium compound as its solute that imparts ionic conductivity, together with its solvent that dissolves and retains the lithium compound, remain undecomposed at voltages during charge, discharge and storage of the battery.

Examples of useful positive electrode materials for the rechargeable lithium battery of the present invention include lithium-containing transition metal oxides such as LiCoO$_2$, LiNiO$_2$, LiMn$_2$O$_4$, LiMnO$_2$, LiCo$_{0.5}$Ni$_{0.5}$O$_2$ and LiNi$_{0.7}$Co$_{0.2}$Mn$_{0.1}$O$_2$; and lithium-free metal oxides such as MnO$_2$. Other substances can also be used, without limitation, if they are capable of electrochemical lithium insertion and deinsertion.

DESCRIPTION OF THE PREFERRED EXAMPLES

Figure 1:
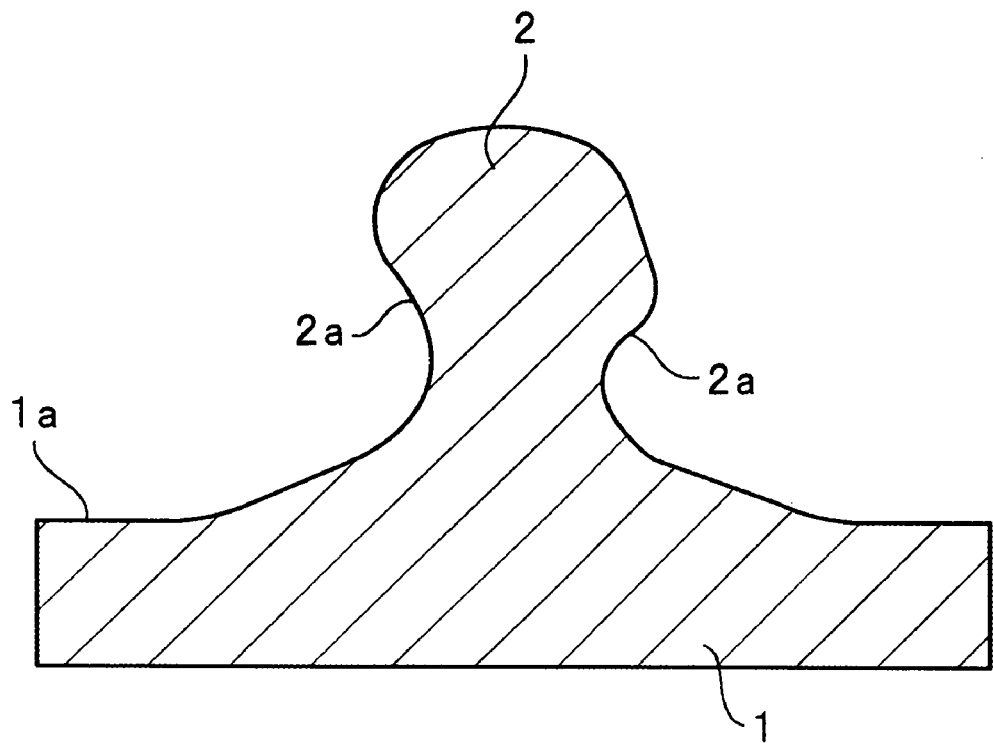
FIG. 1 is a sectional view which shows one embodiment of a projection on a surface of a metal foil current collector in accordance with the present invention.
Figure 2:
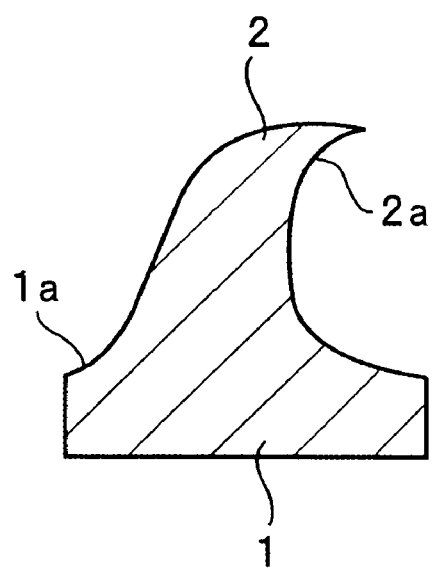
FIG. 2 is a sectional view which shows another embodiment of a projection on a surface of a metal foil current collector in accordance with the present invention.
Figure 3:
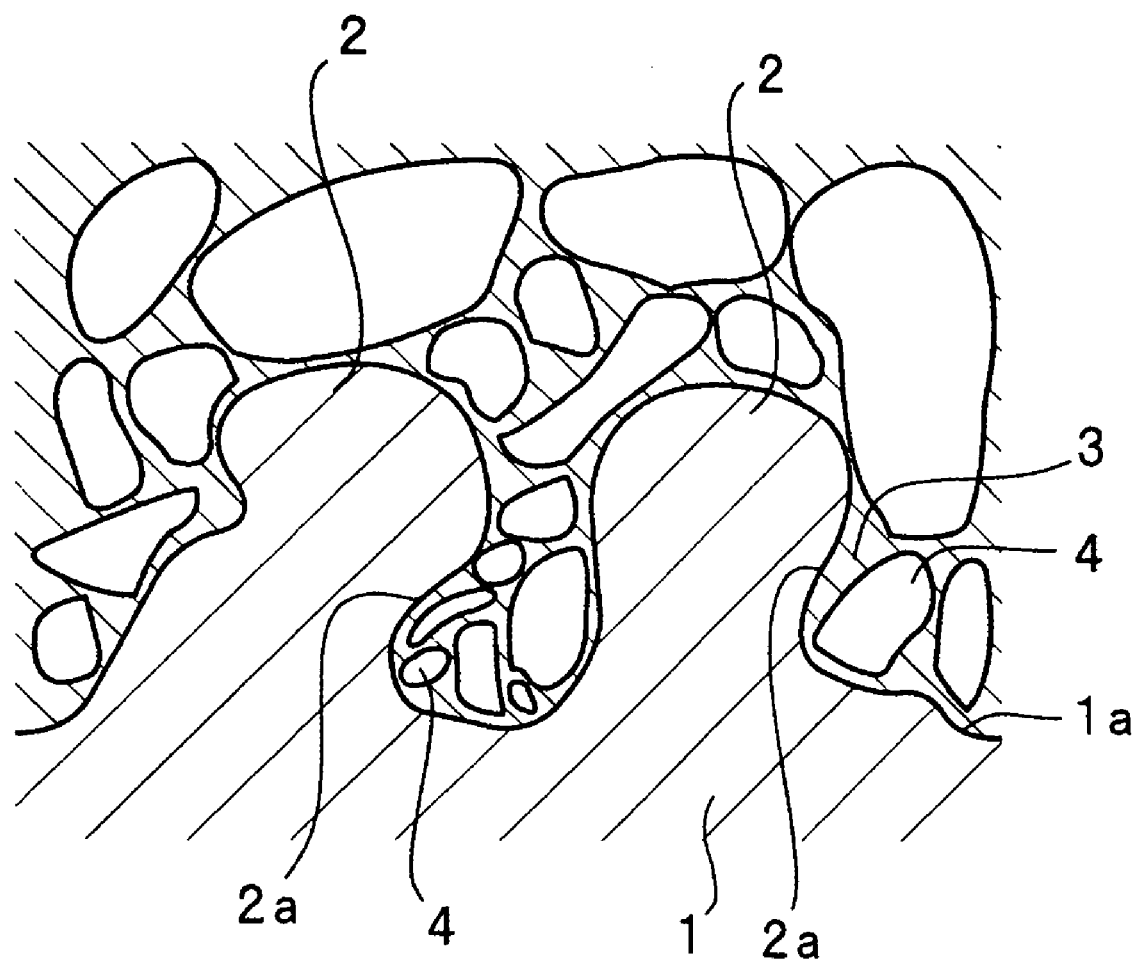
FIG. 3 is a sectional view of an anode mix layer in the condition of being carried on a surface of a metal foil current collector in accordance with the present invention.

The present invention is below described in more detail by way of Examples. The following examples merely illustrate the practice of the present invention but are not intended to be limiting thereof. Suitable changes and modifications can be effected without departing from the scope of the present invention.

Experiment 1

(Fabrication of Negative Electrode)

81.8 parts by weight of a silicon powder (99.9% pure) having a mean particle diameter of 3 μm and an 8.6 wt. % N-methylpyrrolidone solution containing 18.2 parts by weight of polyimide as a binder were mixed to provide an anode mix slurry.

This anode mix slurry was coated on one surface (rough surface) of a cover-plated electrolytic copper foil (35 μm thick) (current collector a1) having a surface roughness Ra of 1.0 μm and then dried. A 25 mm×30 mm rectangle piece was cut out from the coated copper foil, calendered and then sintered by a heat treatment under argon atmosphere at 400° C. for 30 hours to provide a negative electrode. The sintered body (inclusive of the current collector) was 50 μm thick. Accordingly, the thickness of the anode mix layer was 15 μm, anode mix layer thickness/copper foil surface roughness was 15, and anode mix layer thickness/copper foil thickness was 0.43.

In the negative electrode, polyimide was found to have a density of 1.1 g/cm$^3$ and constitute 31.8% of the total volume of the anode mix layer.

Figure 4:
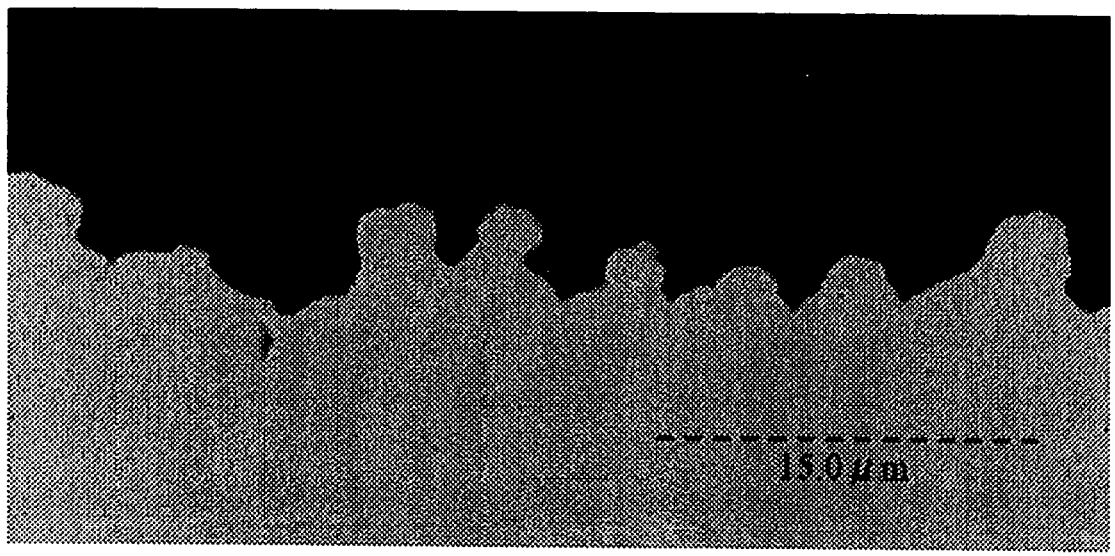
FIG. 4 is a sectional view which shows one embodiment of a metal foil current collector in accordance with the present invention.

FIG. 4 is a sectional view of the current collector a1 when observed by an SEM (with a magnification of 2000×)

(Fabrication of Positive Electrode)

Starting materials, Li$_2$CO$_3$ and CoCO$_3$, were weighed such that a ratio of numbers of Li and Co atoms, Li:Co, was brought to 1:1, and then mixed in a mortar. The mixture was pressed in a 17 mm diameter mold and calcined in the air at 800° C. for 24 hours to obtain a calcined product consisting of LiCoO$_2$. This product was then ground into particles with a mean particle diameter of 20 μm.

90 parts by weight of the resulting LiCoO$_2$ powder and 5 parts by weight of artificial graphite as an electric conductor were added to a 5 wt. % N-methylpyrrolidone (NMP) solution containing 5 parts by weight of polyvinylidene fluoride as a binder to provide a cathode mix slurry.

The cathode mix slurry was coated on an aluminum foil as a current collector, dried and then calendered. A 20 mm×20 mm square piece was cut out from the coated aluminum foil to provide a positive electrode.

(Preparation of Electrolyte Solution)

1 mole/liter of LiPF$_6$ was dissolved in a mixed solvent containing ethylene carbonate and diethyl carbonate at a 3:7 ratio by volume to prepare an electrolyte solution. 5 parts by weight of vinylene carbonate was added to 100 parts by weight of the electrolyte solution to provide an electrolyte solution for use in batteries.

(Construction of Battery)

A rechargeable lithium battery A1 was constructed by inserting the above-prepared positive electrode, negative electrode and electrolyte solution into an outer casing made of laminated aluminum.

Figure 6:
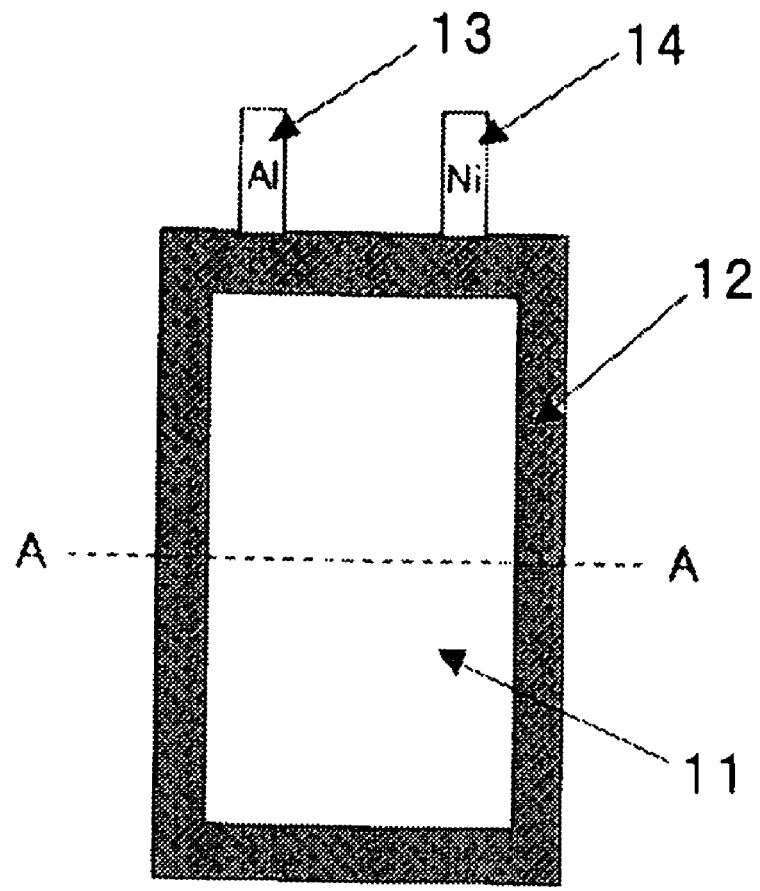
FIG. 6 is a front view which shows a rechargeable lithium battery fabricated in examples of this invention.
Figure 7:
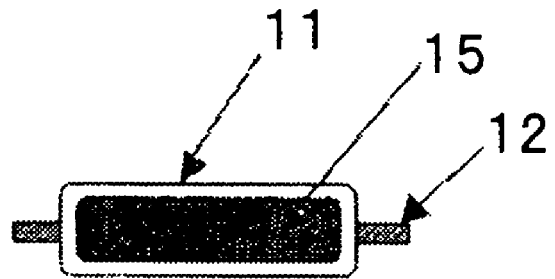
FIG. 7 is a sectional view taken along the line A-A of FIG. 6.

FIG. 6 is a front view of the constructed rechargeable lithium battery. FIG. 7 is a sectional view taken along the line A-A of FIG. 6. A positive electrode and a negative electrode are disposed in opposite sides of a separator and, as an electrode assembly 15, inserted into an outer casing 11 made of laminated aluminum, as shown in FIG. 7. A positive current collector tab 13, made of aluminum, is attached to the positive electrode. A negative current collector tab 14, made of nickel, is attached to the negative electrode. Each tab is constructed to extend outwardly from the outer casing 11. As shown in FIGS. 6 and 7, the outer casing 11 is heat sealed at all edges to include a closed section 12.

Experiment 2

In place of the current collector a1, an electrolytic copper foil (current collector b1) having a surface roughness Ra of 1.0 μm was used. No cover plating was applied thereto. Otherwise, the procedure of Experiment 1 was followed to construct a battery B1.

Figure 5:
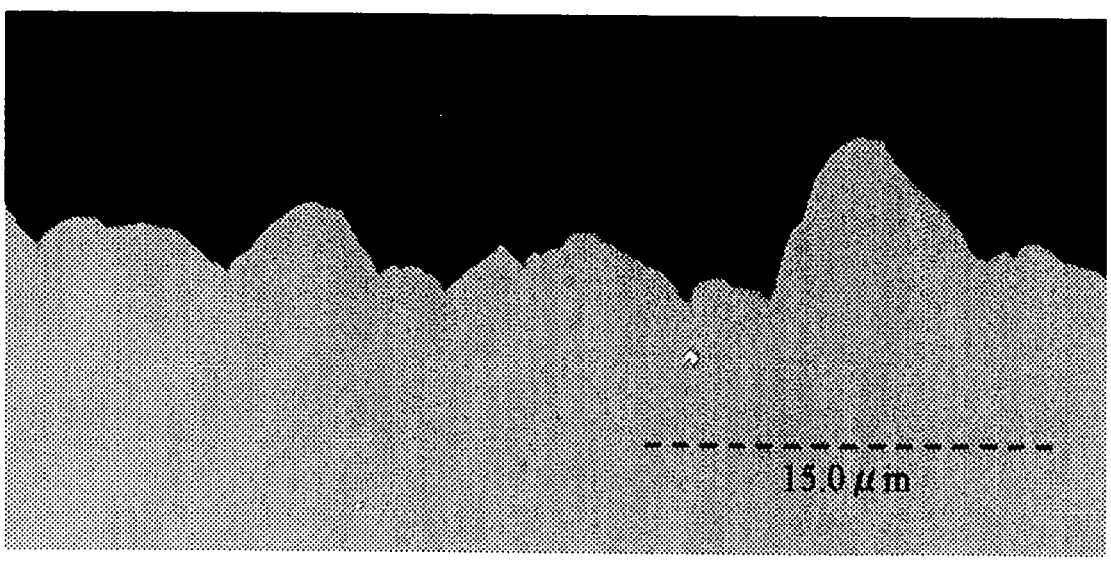
FIG. 5 is a sectional view which shows a comparative metal foil current collector.

FIG. 5 is a sectional view of the current collector b1 when observed by an SEM (with a magnification of 2000×).

(Evaluation of Charge-Discharge Cycle Characteristics)

The above-constructed batteries A1 and B1 were evaluated for charge-discharge cycle performance characteristics. Each battery was charged at 25° C. at a current of 14 mA to 4.2 V and then discharged at a current of 14 mA to 2.75 V. This was recorded as a unit cycle of charge and discharge. The battery was cycled to determine the number of cycles after which its discharge capacity fell down to 80% of its first-cycle discharge capacity and the determined cycle number was recorded as a cycle life. The results are shown in Table 1. The cycle life of each battery is indicated therein by an index when that of the battery A1 is taken as 100.

TABLE 1

| Battery | Current Collector | Cycle Life |
|---------|-------------------|------------|
| A1      | a1                | 100        |
| B1      | b1                | 42         |

As apparent from Table 1, the battery A1 using the current collector a1 in accordance with the present invention exhibits improved cycle characteristics relative to the battery B1 using the comparative current collector b1. This is believed most likely due to the anchor effect of the binder that penetrated into the recurved side face portions of projections, which enhanced adhesion between the current collector and the anode mix layer and maintained their adhesion even when the active material expanded and shrinked during a charge-discharge reaction so that the current collecting capacity within the electrode was retained.

Experiment 3

In this Experiment, the effect of surface roughness Ra of the current collector on cycle characteristics was studied.

In place of the current collector a1, cover-plated electrolytic copper foils having different thickness values were used in Experiment 1. Specifically, an electrolytic copper foil (current collector a2) having a surface roughness Ra of 0.5 μm, an electrolytic copper foil (current collector a3) having a surface roughness Ra of 0.2 μm and an electrolytic copper foil (current collector a4) having a surface roughness Ra of 0.17 μm were used. Using these current collectors, the procedure of Experiment 1 was followed to construct batteries A2, A3 and A4.

The current collectors a2, a3 and a4 were fabricated via cover plating, as similar to the current collector a1, and each includes projections having recurved side face portions as shown in FIG. 4, in accordance with the present invention.

Each battery was evaluated for cycle characteristics in the same manner as above. Its cycle life was given by an index when that of the battery A1 was taken as 100. In Table 2, the cycle life of the battery A1 is also shown.

TABLE 2

| Battery | Current Collector | Surface Roughness of Current Collector (μm) | Cycle Life |
|---------|-------------------|---------------------------------------------|------------|
| A1      | a1                | 1.0                                         | 100        |
| A2      | a2                | 0.5                                         | 95         |
| A3      | a3                | 0.2                                         | 79         |
| A4      | a4                | 0.17                                        | 62         |

As apparent from Table 2, the batteries A1, A2 and A3 using the current collectors a1, a2 and a3 with surface roughness Ra values of 0.2 μm and larger exhibit superior cycle performance characteristics relative to the battery A4 using the current collector a4 with a surface roughness Ra value of below 0.2 μm. This is most probably because the use of the current collector having a surface roughness Ra of 0.2 μm or larger increases a contact area between the active material particles and the current collector surface and thereby allows sintering to be followed effectively to improve adhesion therebetween. The other reason is believed likely due to marked development of an anchor effect that was provided by penetration of the binder into the recurved side face portions of the projections on the current collector. Such marked development of the anchor effect is believed to have further improved adhesion between the anode mix layer and the current collector and accordingly improved the current collecting capacity within the electrode.

Experiment 4

In this Experiment, the effect of sintering on cycle characteristics was studied.

The procedure of Experiment 1 was followed, except that the electrode was subjected to the heat treatment at 600° C. for 10 hours, to construct a battery A5. Also, the procedure of Experiment 1 was followed, except that the electrode was not subjected to the heat treatment, to construct a comparative battery B2.

These batteries were evaluated for cycle characteristics in the same manner as above. Their cycle lives are given by indexes when the cycle life of the battery A1 is taken as 100. In Table 3, the cycle life of the battery A1 is also shown.

TABLE 3

| Battery | Electrode Heat-Treating Conditions | Cycle Life |
|---------|-------------------------------------|------------|
| A1      | 400° C., 30 Hours                   | 100        |
| A5      | 600° C., 10 Hours                   | 60         |
| B2      | Not Applied                         | 17         |

As apparent from Table 3, the batteries A1 and A5 using the electrodes made with heat treatment exhibits far superior cycle characteristics compared to the comparative battery B2 using the electrode made without heat treatment. This is believed due to the heat treatment that sintered the active material particles and the metal foil current collector to enhance adhesion between the anode mix layer and the current collector and accordingly improve the current collecting capacity within the electrode.

As can be appreciated, the battery A5 incorporating the electrode made with the heat treatment at 600° C. for 10 hours exhibits inferior cycle performance characteristics relative to the battery A1 incorporating the electrode made with the heat treatment at 400° C. for 30 hours. This is probably because the heat treatment at 600° C. caused decomposition of the binder and resulted in the marked reduction in adhesion between components within the electrode and accordingly the decrease of current collecting capacity.

Experiment 5

In this Experiment, the effect of the electrically conductive powder loaded in the anode mix layer on cycle performance characteristics was studied.

The procedure of Experiment 1 was followed, except that a copper powder having a mean particle diameter of 3 μm was added to the anode mix layer in the amount of 20% of the total weight of the copper powder and silicon powder, to construct a battery A6.

This battery was evaluated for cycle characteristics in the same manner as described above. Its cycle life is given by an index when that of the battery A1 is taken as 100. In Table 4, the cycle life of the battery A1 is also shown.

TABLE 4

| Battery | Loaded Conductive Powder | Cycle Life |
|---------|--------------------------|------------|
| A1      | None                     | 100        |
| A6      | Copper                   | 102        |

As can be clearly seen from Table 4, the battery A6 with the copper powder loaded in the anode mix layer exhibits improved cycle performance characteristics compared to the battery A1 with the copper powder unloaded in the anode mix layer. This is most probably because the conductive powder formed a conductive network surrounding the active material particles and, as a result, improved the current collecting capacity within the anode mix layer.

In the preceding examples, the anode mix layer is provided on only one side of the negative current collector. However, the anode mix layer may be provided on both sides of the current collector. In this case, the current collector preferably has the projections specified in the present invention on its both sides.

The present invention can improve the cycle performance characteristics of negative electrodes, for use in rechargeable lithium batteries, which incorporate particles of active material containing silicon and/or a silicon alloy.

What is claimed is:

1. A negative electrode for a rechargeable lithium battery which is obtained by sintering under a non-oxidizing atmosphere, on a surface of a metal foil current collector, an anode mix layer containing a binder and particles of active material containing silicon and/or a silicon alloy;
    said negative electrode being characterized in that said metal foil current collector has projections and recesses on its surface, said projections are shaped to have a side face portion that curves inwardly from the base of the projection and curves outwardly as it extends closer to a distal end of the projection, and said binder penetrates into spaces defined by said side face portion.

2. The negative electrode for a rechargeable lithium battery as recited in claim 1, characterized in that said projection is shaped to include a narrow portion which defines said side face portion.

3. A negative electrode for a rechargeable battery which is obtained by sintering under a non-oxidizing atmosphere, on a surface of a metal foil current collector, an anode mix layer containing a binder and particles of active material containing silicon and/or a silicon alloy;
    said negative electrode being characterized in that said metal foil current collector has projections and recesses on its surface, said projections are shaped to have a side face portion that curves inwardly from the base of the projection and curves outwardly as it extends closer to a distal end of the projection, and said binder penetrates into spaces defined by said side face portions and being further characterized in that said particles of active material penetrate into the spaces defined by the side face portions.

4. The negative electrode for a rechargeable lithium battery as recited in claim 1, characterized in that said current collector has a surface roughness Ra of 0.2 μm or above.

5. The negative electrode for a rechargeable lithium battery as recited in claim 1, characterized in that said current collector comprises a metal foil obtained by subjecting an electrolytic metal to a surface roughening treatment by an electroplating process.

6. The negative electrode for a rechargeable lithium battery as recited in claim 1, characterized in that said current collector comprises a metal foil obtained by subjecting an electrolytic copper or copper alloy foil to a surface roughening treatment by an electroplating process.

7. The negative electrode for a rechargeable lithium battery as recited in claim 5, characterized in that said surface roughening treatment by an electroplating process is cover plating.

8. The negative electrode for a rechargeable lithium battery as recited in claims 1, characterized in that said binder remains undecomposed after the heat treatment for sintering.

9. The negative electrode for a rechargeable lithium battery as recited in claim 1, characterized in that said binder comprises polyimide.

10. The negative electrode for a rechargeable lithium battery as recited in claim 1, characterized in that said particles of active material comprise silicon particles.

11. The negative electrode for a rechargeable lithium battery as recited in claim 1, characterized in that an electrically conductive powder is loaded in said anode mix layer.

12. A method for fabricating a negative electrode for a rechargeable lithium battery, characterized as including the steps of:
    providing a metal foil current collector which has recesses and projections on its surface, said projections being shaped to have a side face portion that curves inwardly from the base of the projection and curves outwardly as it extends closer to a distal end of the projections;
    providing a layer of an anode mix on the surface of the metal foil current collector, the anode mix containing a binder and particles of active material that contains silicon and/or a silicon alloy; and
    sintering, under a non-oxidizing atmosphere, the anode mix layer while placed on the surface of the metal foil current collector.

13. The method for fabricating a negative electrode for a rechargeable lithium battery as recited in claim 12, characterized in that said anode mix layer can be provided on the surface of the metal foil current collector by dispersing the particles of active material in a solution of the binder to prepare a slurry and applying said slurry onto the surface of the metal foil current collector.

14. A rechargeable lithium battery characterized as including a negative electrode comprising the negative electrode as recited in claim 1, a positive electrode containing a positive electrode material, and a nonaqueous electrolyte.

15. A rechargeable lithium battery characterized as including a negative electrode comprising the negative electrode fabricated by the method as recited in claim 12, a positive electrode containing a positive electrode material, and a nonaqueous electrolyte.

16. The negative electrode for a rechargeable lithium battery as recited in claim 11, characterized in that said electrically conductive powder is made from copper, nickel, iron, titanium, cobalt, an alloy or mixture thereof.

* * * * *